US009931927B2

(12) United States Patent
Heater et al.

(10) Patent No.: US 9,931,927 B2
(45) Date of Patent: Apr. 3, 2018

(54) CONTAINMENT SYSTEMS (75) Inventors: Kenneth J. Heater, Westerville, OH (US); Donald M. Bigg, Stuart, FL (US); Jonathan L. Macarus, Columbus, OH (US); Daniel E. Badowski, Sunbury, OH (US)

(73) Assignee: Material Engineering and Technical Support Services Corporation, Westerville, OH (US)

( * ) Notice: Subject to any disclaimer, the term of this patent is extended or adjusted under 35 U.S.C. 154(b) by 52 days.

(21) Appl. No.: 12/796,295

(22) Filed: Jun. 8, 2010

(65) Prior Publication Data

US 2010/0316310 A1 Dec. 16, 2010

Related U.S. Application Data (60) Provisional application No. 61/186,703, filed on Jun. 12, 2009.

(51) Int. Cl.
| | |
|---|---|
| *B65D 1/40* | (2006.01) |
| *B65D 3/22* | (2006.01) |
| *A47G 19/22* | (2006.01) |
| *B60K 15/03* | (2006.01) |
| *B65D 88/16* | (2006.01) |

(52) U.S. Cl.
CPC .... *B60K 15/03177* (2013.01); *B65D 88/1606* (2013.01); *B60K 2015/03046* (2013.01); *B60K 2015/03493* (2013.01); *F17C 2201/0176* (2013.01); *F17C 2203/0685* (2013.01)

(58) Field of Classification Search
CPC .............................................. F17C 2201/0109

USPC ...................... 383/117, 119; 428/34.7, 36.1; 220/62.19, 9.1, 9.4; 9/117, 119
See application file for complete search history.

(56) References Cited

U.S. PATENT DOCUMENTS

| | | | |
|---|---|---|---|
| 2,376,831 A | 10/1945 | Stearns | |
| 2,626,882 A | 1/1953 | Gerke | |
| 3,483,907 A * | 12/1969 | Corridon | 383/76 |
| 3,664,904 A * | 5/1972 | Cook | 428/102 |
| 3,779,420 A * | 12/1973 | Knaus | 220/4.14 |
| 3,989,562 A * | 11/1976 | Hladik et al. | 156/79 |
| 4,265,956 A * | 5/1981 | Colijn | 428/134 |
| 4,301,961 A * | 11/1981 | Rodish | 383/119 |
| 4,345,698 A * | 8/1982 | Villemain | 220/560.02 |
| 4,739,895 A * | 4/1988 | Bachmann | 220/627 |

(Continued)

FOREIGN PATENT DOCUMENTS

| | | |
|---|---|---|
| EP | 1520683 A2 | 4/2005 |
| EP | 1659331 A1 | 5/2006 |

(Continued)

OTHER PUBLICATIONS

Examination Report in Australian Pat. App. No. 2010258891, dated Dec. 22, 2015.

(Continued)

*Primary Examiner* — Derek Battisti (74) *Attorney, Agent, or Firm* — Benesch Friedlander Coplan & Aronoff, LLP; Benjamen E. Kern; Stephen D. Scanlon (57) ABSTRACT

Containment systems are provided. In one example embodiment, a containment system is provided, the containment system comprising: a container; and a skeletal reinforcement comprised of flexible fibers.

16 Claims, 5 Drawing Sheets

(56) References Cited

U.S. PATENT DOCUMENTS

| | | | |
|---|---|---|---|
| 4,854,988 A * | 8/1989 | Voirol et al. | 156/155 |
| 4,871,598 A | 10/1989 | Potente et al. | |
| 5,024,865 A * | 6/1991 | Insley | 428/36.4 |
| 5,180,190 A * | 1/1993 | Kersey et al. | 280/838 |
| 5,306,534 A * | 4/1994 | Bosses | 428/35.2 |
| 5,665,301 A * | 9/1997 | Alanko | B29C 70/548 264/257 |
| 5,738,921 A | 4/1998 | Andersen et al. | |
| 6,247,619 B1 * | 6/2001 | Gill et al. | 222/105 |
| 7,341,377 B1 * | 3/2008 | Baxter | 383/38 |
| 7,851,035 B2 * | 12/2010 | Fushimi et al. | 428/34.7 |
| 7,993,712 B2 * | 8/2011 | Chiang | 428/34.4 |
| 8,074,826 B2 * | 12/2011 | Cronin et al. | 220/589 |
| 2003/0031387 A1 * | 2/2003 | Gipson et al. | 383/64 |
| 2003/0031388 A1 * | 2/2003 | Gipson et al. | 383/64 |
| 2003/0183638 A1 | 10/2003 | Minta et al. | |
| 2005/0053315 A1 * | 3/2005 | Aasen | 383/119 |
| 2005/0077293 A1 * | 4/2005 | Fitzgerald | 220/62.19 |
| 2005/0085146 A1 | 4/2005 | Farkas et al. | |
| 2005/0087537 A1 | 4/2005 | Kimbara et al. | |
| 2007/0151983 A1 * | 7/2007 | Patel | H01M 8/04186 222/95 |
| 2008/0023483 A1 | 1/2008 | Kanach | |
| 2008/0160236 A1 * | 7/2008 | Lockwood et al. | 428/34.7 |
| 2010/0224626 A1 * | 9/2010 | Monk et al. | 220/62.19 |

FOREIGN PATENT DOCUMENTS

| | | |
|---|---|---|
| FR | 445888 A | 11/1912 |
| JP | 2005113963 A | 7/2009 |
| WO | 01/57429 A1 | 8/2001 |
| WO | 01/96766 A1 | 12/2001 |
| WO | 2006/110754 A2 | 10/2006 |

OTHER PUBLICATIONS

Communication in European Pat. App. No. 10786724.4, dated Apr. 12, 2016.

Examination Report in Canadian Pat. App. No. 2,765,248, dated Apr. 25, 2016.

* cited by examiner

CONTAINMENT SYSTEMS

CROSS-REFERENCE TO RELATED APPLICATIONS

This application claims priority from U.S. Provisional Patent Application No. 61/186,703, filed on Jun. 12, 2009, which is incorporated by reference herein in its entirety.

BACKGROUND

Rubber, plastic, metal, fiber reinforced plastic or rubber, and paper containers are commonly used to hold and transport a wide variety of liquids, gases, and fine particulate solids.

Liquid filled containers may include, for example, fuel tanks, bladders, and cells, liquid water containers, and liquid containers such as portable tanks, collapsible tanks, and pillow tanks containing liquid chemicals that may or may not be hazardous to the environment. Fuel bladders, including aircraft fuel bladders (fixed wing and helicopter), are typically designed to be lightweight. Aircraft fuel bladders are often constructed to be deformable so that they can be inserted into a space within the aircraft to support fuel containment. Lightweight, ground-based tanks (for fuel, water, or other materials) are also desirable to reduce logistics and transportation costs, and lightweight tank designs in vehicles (ground or marine) can increase fuel economy. Flexible and lightweight containers are often at risk of blunt impact damage from, e.g., a drop, a collision with another object, ballistic impact, or an impact from another high speed projectile. Likewise, rigid or semi-rigid containers may crack or fracture upon sustaining blunt impact damage. Blunt impact damage may include, for example, initial impact forces, as well as any forces that result from an impact event, including, for example, hydraulic ram and like effects due to pressure waves created within the containment structure as a result of the impact event.

Gas filled containers may include, for example, light airships such as weather balloons and blimps, and inflatable boats. Gas filled containers may be made from, for example, fabric coated rubber or plastic, thin films of plastic (e.g., polyethylene terephthalate), or flexible hollow plastic structures. Like liquid filled containers, gas filled containers often are designed to be flexible and lightweight. Gas filled containers are also often at risk for blunt impact damage. In addition, gas filled containers may be subject to internal pressure increases from changes in atmospheric conditions.

Particulate filled containers may include, for example, fabric or fiber reinforced plastic bags containing fertilizers, sand, cement, powder coating resins, and the like. Such containers are often at risk for blunt impact damage from, e.g., a drop during handling or a collision with another object during shipping.

As set forth above, common desirable elements of liquid, gas, and particulate filled containers include flexibility, minimal weight, and resistance to impact. A need exists to provide reinforcement to such containers. Current reinforcement systems unduly restrict flexibility, are too weighty, or provide inadequate resistance to pressure loads, including loads resulting from impact or other over-stresses.

SUMMARY

In one embodiment, a containment system is provided, the containment system comprising: a container; and a skeletal reinforcement comprised of flexible fibers.

In another embodiment, a reinforced liquid (e.g., water or fuel) bladder is provided, the reinforced liquid bladder comprising: a liquid bladder comprising: an inner liner; a liquid (e.g., water or fuel) barrier coating; and at least one rubber impregnated fabric layer; and a polymeric skeletal reinforcement.

In yet another embodiment, a containment system is provided for reinforcing a flexible, semi-rigid, or rigid container, the containment system comprising: a flexible fibrous skeletal material, configured to: (1) at least partially conform to a shape of the flexible, semi-rigid, or rigid container; and (2) redistribute a force of impact, loading, or hydraulic ram, and thereby prevent the flexible, semi-rigid, or rigid container from experiencing stresses or strains that exceed a failure limit of the flexible, semi-rigid, or rigid container.

In yet another embodiment, a containment system is provided for reinforcing a rigid or semi-rigid container, the containment system comprising: (i) a flexible container; and (ii) a flexible fibrous skeletal material, each configured to: (1) at least partially conform to the shape of the rigid or semi-rigid container; and (2) redistribute a force of impact or loading, and thereby either: (a) prevent the rigid or semi-rigid container from experiencing stresses or strains that exceed a failure limit of the rigid or semi-rigid container; or, in the event the rigid or semi-rigid container fails, (b) at least partially contain a contents of the rigid or semi-rigid container.

BRIEF DESCRIPTION OF THE DRAWINGS

In the accompanying drawings, structures are illustrated that, together with the detailed description provided below, describe example embodiments of the claimed invention. In the drawings and description that follow, like elements are sometimes identified with the same or similar reference numerals. The drawings are not to scale and the proportion of certain elements may be exaggerated for the purpose of illustration.

DETAILED DESCRIPTION

Figure 1:
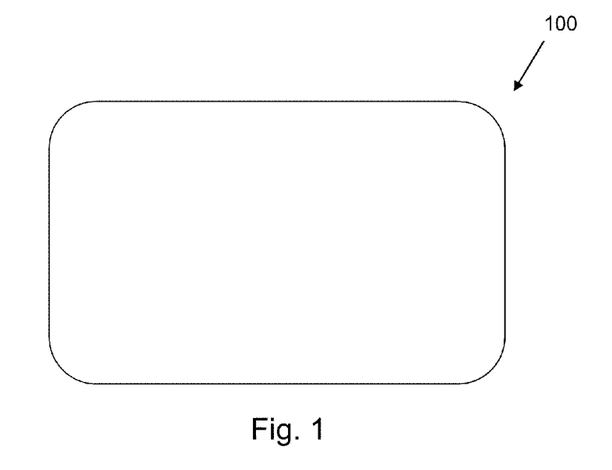
FIG. 1 is a schematic drawing of a cross-section of an example flexible container 100 at rest.
Figure 2:
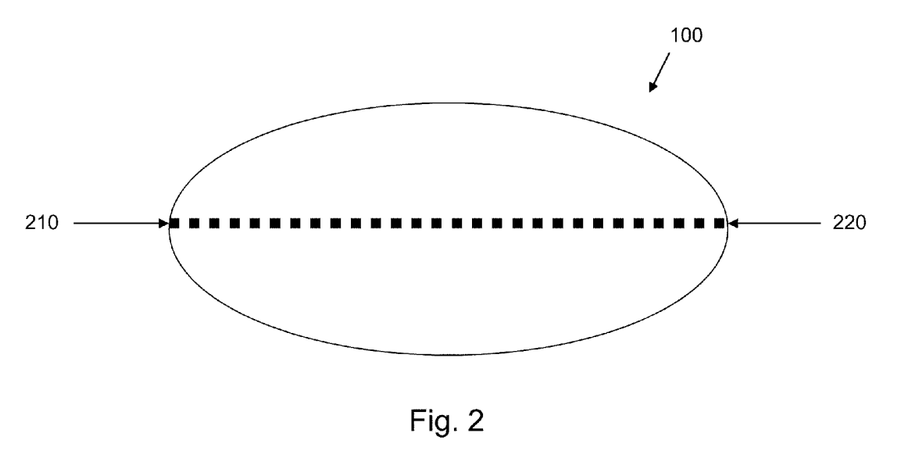
FIG. 2 is a schematic drawing of a cross-section of flexible container 100 during impact.

FIG. 1 is a schematic drawing of a cross-section of an example flexible container 100 at rest. Flexible container 100 can represent any number of liquid filled, gas filled, or particulate filled containers. FIG. 2 is a schematic drawing of a cross-section of flexible container 100 during impact or other over-stressing. As shown in FIG. 2, the sides of container 100 may bulge out in response to a re-directing of forces. The areas of maximum hoop stress may correspond with the areas of maximum deflection, shown in FIG. 2 at points 210 and 220.

Without adequate reinforcement, flexible container 100 may rupture or otherwise fail during impact or other over-stressing. The present embodiments disclose containment systems that may redistribute forces that result from impact, or other over-stressing forces, and constrain flexible container 100 from stretching beyond its strain limit. In other words, the present embodiments disclose example containment systems that may prevent such containers from experiencing stresses or strains that exceed a failure limit of such containers, including preventing failures that may result in, e.g., leaks.

In one embodiment, a containment system is provided, the containment system comprising: a flexible, rigid, or semi-rigid container; and a skeletal reinforcement comprised of flexible fibers.

In one embodiment, the flexible, rigid, or semi-rigid container is configured to contain at least one of a liquid, a gas, and a particulate solid. In one embodiment, the flexible, rigid, or semi-rigid container may be comprised of at least one of plastic, rubber, fabric reinforced plastic, fabric reinforced rubber, and paper. In another embodiment, the flexible, rigid, or semi-rigid container may be a non-permeable laminate structure. Example flexible, rigid, or semi-rigid containers may include, for example, rotomolded polyethylene tanks, blow molded plastic tanks, vinyl and polyurethane coated fabric lay-ups, rubber coated fabric lay-ups, blow molded polyurethane tanks, thin-walled metal tanks, composite panels, and heat sealed thin plastic films.

In one embodiment, the fibers may be high strength, high modulus fibers. In one embodiment, the fibers may be comprised of organic materials, such as, for example, polymeric fibers. The use of polymeric fibers allows for weight reduction in comparison to additional plies in the container of, for example, flexible, impermeable laminate, or in comparison to a skeletal reinforcement constructed of a higher density material, such as metal.

For example, in one embodiment, the skeletal reinforcement may comprise, consist essentially of, or consist of ultrahigh modulus, ultrahigh molecular weight polyethylene fibers. In one embodiment, the polyethylene fibers may have a density of about 0.97 g/cc. Suitable polyethylene fibers are known under their brand names as SPECTRA (manufactured by Honeywell) and DYNEEMA (manufactured by DSM).

Other example organic fibers may include aramid fibers (e.g., KEVLAR or TWARON), liquid crystal fibers (e.g., VECTRAN), M5 fibers, ZYVEX, carbon fibers, glass fibers, nylon fibers, polyester fibers, polypropylene fibers, silk fibers, cellulose based fibers, and the like.

In another embodiment, the fibers are comprised of ceramic materials, such as, for example, glass fibers, aluminum oxide fibers, and boron nitride fibers.

In one embodiment, the fibers are exclusive of metal. However, in an alternative embodiment, the fibers may be comprised of metallic fibers, such as, for example, stainless steel fibers, copper alloy fibers, and aluminum fibers. In one embodiment, skeletal reinforcement made from such metallic fibers has a very low areal density. In another embodiment, such metallic fibers are in the form of flexible fibers and/or braided fibers.

In one embodiment, the fibers may be loosely woven or joined in the form of netting. In another embodiment, the fibers may be woven in the form of a fabric. In yet another embodiment, the fibers may be woven in the form of a fabric strapping that may be joined in a netting configuration.

Figure 3:
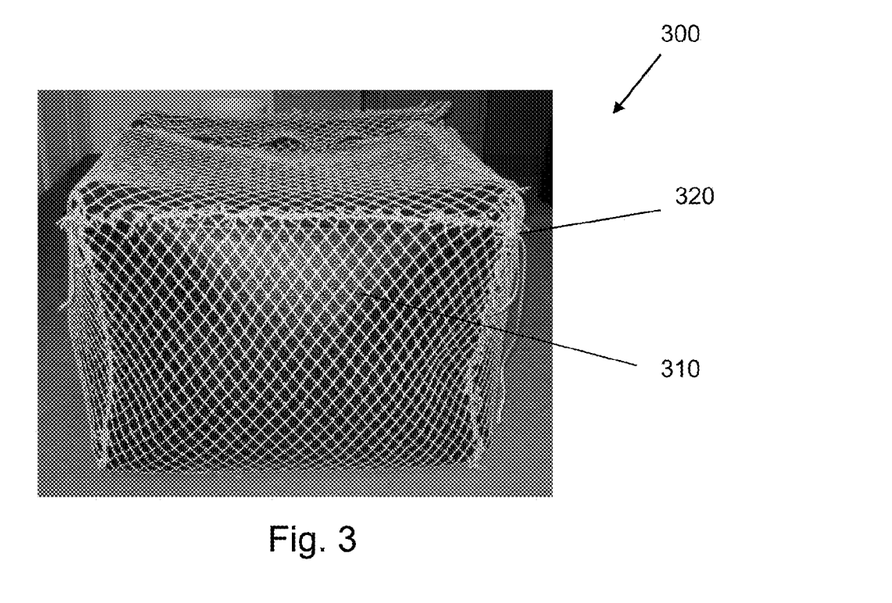
FIG. 3 is a perspective view of an example flexible container 300 having a skeletal reinforcement.
Figure 4:
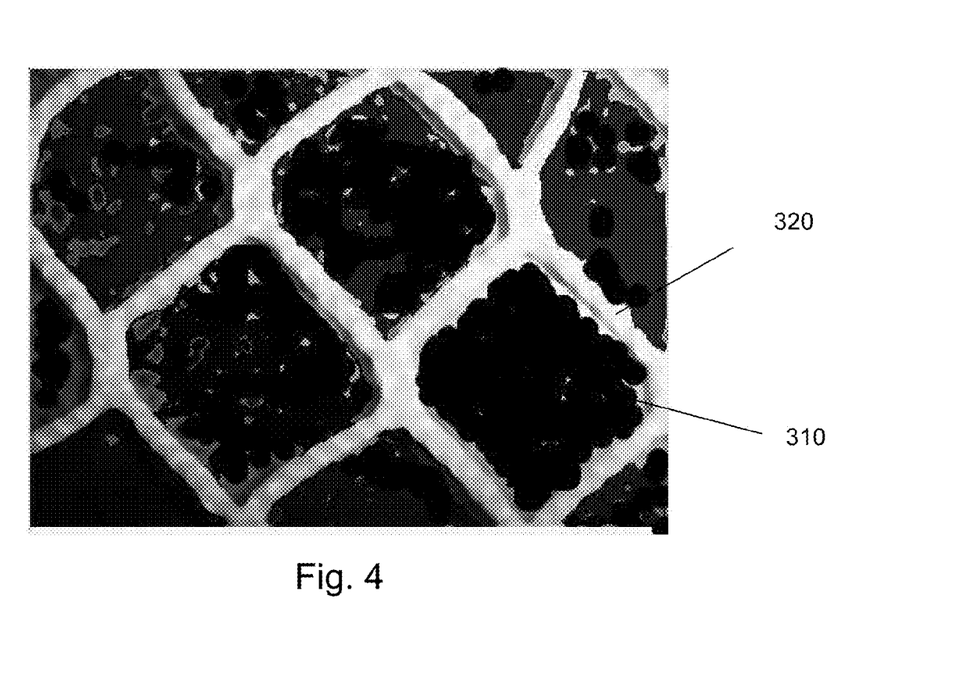
FIG. 4 is a close-up front view of flexible container 300 having a skeletal reinforcement.

FIG. 3 illustrates a perspective view of one example embodiment of a containment system, 300. FIG. 4 illustrates a close up front view of the same. In the embodiments illustrated in FIGS. 3 and 4, a flexible container 310 is surrounded by a skeletal reinforcement 320 comprised of high strength, high modulus fibers. It should be noted that while skeletal reinforcement 320 is illustrated as an "exo-skeleton netting" with respect to flexible container 310, and may be described as such in the present embodiments, it is equally contemplated that skeletal reinforcement 320 may have various orientations, may be in the form of a woven material or strapping, and may be incorporated within or, stated alternatively, may be other than the outermost material used in the construction of, containment system 300.

In the illustrated embodiment, flexible container 310 has a hexahedron shape. Alternatively, flexible container 310 may have a spherical, cylindrical, or other geometric shape.

In one embodiment, the high modulus of the fibers may enable the skeletal reinforcement to redistribute impact forces by constraining the flexible container from stretching beyond its strain limit during impact or over-stressing during a less dynamic situation (e.g., over-pressurizing). The skeletal reinforcement may redistribute the impact forces over a larger surface area of the flexible container.

Figure 5:
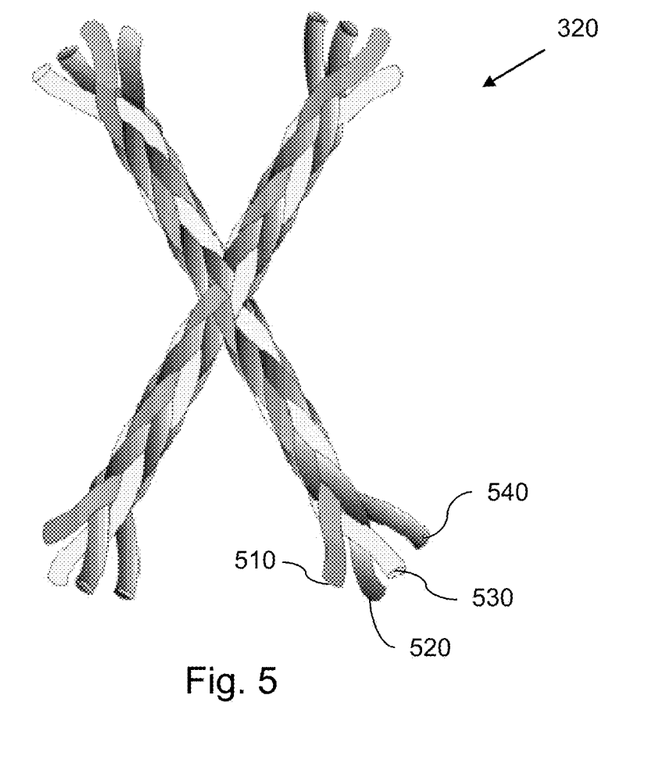
FIG. 5 is a front view of one example of skeletal material.

FIG. 5 illustrates a partial front view of the skeletal reinforcement 320. In the illustrated embodiment, the skeletal reinforcement 320 is a braided construction. A plurality of fibers 510, 520, 530, and 540 are braided into a plurality of yarns that form a net. In the illustrated embodiment, the netting construction is such that the individual fibers are essentially unidirectional along the yarn forming the netting structure. In other words, in this embodiment, there are no knots or changes in fiber direction through any nodes of the netting construction. In particular, in the illustrated embodiment, there are no 180-degree changes in direction of the fibers. Such changes may constitute stress concentrators and may weaken the netting. In one embodiment, the fibers in the netting may be essentially knot free and substantially unidirectional, thus maximizing the strength of each fiber. However, it should be understood that for manufacturing and other purposes, knots may be employed in the skeletal reinforcement. Moreover, other means of applying the skeletal reinforcement, such as, for example, netting, material, or strapping are within the scope of the present embodiments.

While FIG. 5 shows four example fibers 510, 520, 530, and 540, in each yarn, it should be understood that this is for illustrative purposes only. In practice, each yarn may have between about 1 and 250 fibers. In one embodiment (as shown in FIG. 3), the skeletal reinforcement may be affixed at one or more corners of a rectangular flexible container by hand sewing with DYNEEMA fibers, and the ends may be stabilized by knots. Alternatively, the skeletal reinforcement may be applied by a continuous braiding process. A continuous braiding process eliminates the hand sewing and knotting operation. Any weaving, knitting, braiding, spin lay-up, or hand sewing process that produces an open fiber structure around the bladder represents a possible alternative. In an alternative embodiment, a strapping material that is cross-laid and sewn together at the intersections, similar to a cargo netting material, may be used. In yet another alternative embodiment, a lightweight, high strength fabric that is cut and sewn together at the intersections may be used.

In one embodiment, the skeletal reinforcement may have a weight of greater than or equal to about 0.005 lbs/sq ft. In another embodiment, the skeletal reinforcement may have a weight of less than or equal to about 0.10 lbs/sq ft. Of course, weights of less 0.005 lbs/sq ft. and greater than 0.10 lbs/sq ft. are contemplated. This range merely represents an example working range. In one embodiment, the skeletal reinforcement may have a weight of about 0.050 pounds per square foot. In another embodiment, the skeletal reinforcement may have a weight of about 0.045 pounds per square foot. In still another embodiment, the skeletal reinforcement may have a weight of about 0.030 pounds per square foot. In another embodiment, the skeletal reinforcement may have a weight of about 0.027 pounds per square foot.

In one embodiment, a reinforced liquid (e.g., water or fuel) bladder is provided, the reinforced liquid bladder comprising: an inner liner; a liquid (e.g., water or fuel) barrier coating; and at least one rubber impregnated fabric layer; and a polymeric skeletal reinforcement.

In one embodiment, the inner liner may be comprised of a polymeric fabric impregnated rubber. In another embodiment, the inner liner may be comprised of at least one of nitrile rubber, hydrogenated nitrile rubber, and polyurethane rubber in combination with one of nylon-66, nylon-6, polyester fibers, or a combination thereof.

Nitrile rubber is often used because of its resistance to modified kerosene, including JP-8, a commonly used aircraft fuel. Aircraft fuel bladders are known to have an inner liner in addition to layers of reinforcing fabric. The inner liner is often the layer adjacent to the fuel. The aircraft fuel bladder inner layer is typically made from nitrile rubber and contains a lightweight fiber fabric. That fabric is for dimensional stability of the rubber and may or may not contribute to the overall strength of the bladder.

Nitrile rubber is not completely impermeable to fuel. Consequently, for improved reduction in permeability, a fuel barrier layer may be added or sprayed on one or more of the inner layers of the bladder construction. The fuel barrier may be a coating of a special nylon plastic from solution that prevents permeation of the fuel through the bladder.

The bladder may also comprise several layers of reinforcing nylon fabric. This fabric may be impregnated by rubber and may provide the bladder with shape, mechanical durability, and strength. In one embodiment, the rubber impregnated fabric layer may be comprised of: (1) rubber comprising at least one of nitrile and polyurethane; and (2) fabric comprising at least one of nylon and polyester.

In one embodiment, the reinforced liquid bladder may further comprise a layer of self-sealing rubber. The self-sealing rubber may prevent leaks from punctures. The self-sealing layer may be, for example, natural rubber or its synthetic analog, isoprene, as well as other fuel absorbent materials. In one embodiment, if the bladder is penetrated by a projectile, the self-sealing rubber may be able to absorb the fuel and swell to plug a hole left by the projectile. This self-sealing rubber layer is typically within the reinforcing fabric-rubber layers of the bladder. The self-sealing rubber layer may or may not contribute to the impact or strength performance of the bladder.

In one embodiment, the polymeric skeletal reinforcement may be comprised of an external skeletal netting, material, or strapping as described herein. In one embodiment, the polymeric skeletal reinforcement may be comprised of ultra-high modulus, ultrahigh molecular weight polyethylene. In another embodiment, the polymeric skeletal reinforcement may have a weight of less than about 0.10 pounds per square foot.

Figure 6:
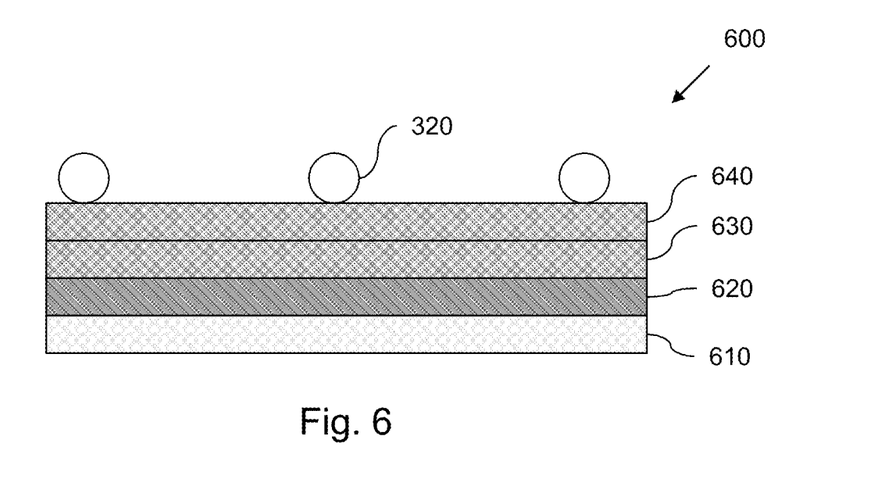
FIG. 6 is a partial cross section of a fabric reinforced rubber flexible bladder used to contain and store fuel.

FIG. 6 illustrates a partial cross-section of an example fuel bladder, 600. In one embodiment, fuel bladder 600 may be comprised of a bladder comprising a nitrile butadiene rubber ("NBR") or hydrogenated nitrile butadiene rubber ("HNBR") coated inner liner 610 configured to contain fuel. As depicted in fuel bladder 600, inner liner 610 is the layer that is in contact with the fuel. Thus, generally speaking, it may be desirable to have inner liner 610 be more resistant to the fuel than the other layers of fuel bladder 600. Inner liner 610 may be covered with a nylon fuel barrier 620. As depicted in fuel bladder 600, reinforcement layers 630 and 640 cover nylon fuel barrier 620. It should be understood that additional reinforcement layers may be included.

In yet another embodiment, a containment system for reinforcing a flexible container is provided, the containment system comprising: a flexible fibrous skeletal netting, materials, or strapping configured to: (1) at least partially conform to the shape of a flexible container; and (2) redistribute a force of impact or loading.

In one embodiment, the flexible fibrous skeletal netting, material, or strapping is comprised of at least one of polyethylene fibers, polypropylene fibers, nylon fibers, polyester fibers, aramid fibers, carbon fibers, liquid crystal fibers, silk fibers, cellulose based fibers, glass fibers, aluminum oxide fibers, and boron nitride fibers. In another embodiment, the flexible fibrous skeletal netting, material, or strapping is configured to be externally disposed with respect to the container.

In yet another embodiment, a containment system is provided for reinforcing a rigid or semi-rigid container, the containment system comprising: (i) a flexible container; and (ii) a flexible fibrous skeletal material, each configured to: (1) at least partially conform to the shape of the rigid or semi-rigid container; and (2) redistribute a force of impact or loading, and thereby either: (a) prevent the rigid or semi-rigid container from experiencing stresses or strains that exceed a failure limit of the rigid or semi-rigid container; or, in the event the rigid or semi-rigid container fails, (b) at least partially contain a contents of the rigid or semi-rigid container.

Figure 7:
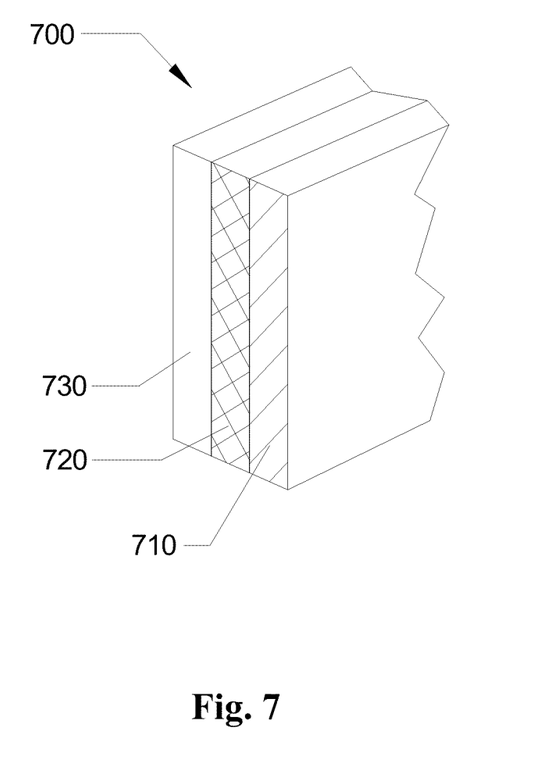
FIG. 7 is a partial cross section of a container at least partially surrounded by a skeletal reinforcement and an exterior shell.

FIG. 7 illustrates a partial cross section of such an example containment system 700. As shown, containment system 700 includes an inner container 710. In one embodiment, inner container 710 is rigid or semi-rigid. As shown, containment system 700 further includes an exoskeleton reinforcement 720 at least partially surrounding inner container 710. Exoskeleton reinforcement 720 may serve to reinforce inner container 710 by redistributing impact forces over the entire structure of containment system 700, so that force concentration at localized sites may be minimized and failure may be prevented. In the embodiment shown in FIG. 7, containment system 700 further includes an exterior flexible shell 730 at least partially surrounding inner container 710 and exoskeleton reinforcement 720. Flexible shell 730 provides an additional barrier to contain the contents of inner container 710, should rigid or semi-rigid inner container 710 actually fail. Inner container 710 may alternatively be flexible, and exterior flexible shell 730 may alternatively be rigid or semi-rigid.

Figure 8:
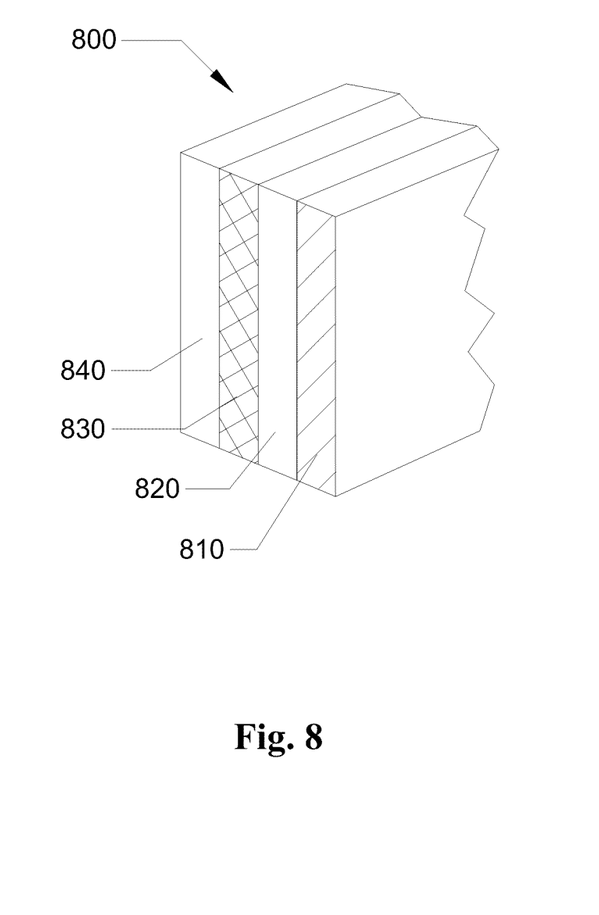
FIG. 8 is a partial cross section of a container at least partially surrounded by an intermediate container, a skeletal reinforcement, and an exterior shell.

FIG. 8 illustrates a partial cross section of another example containment system 800. As shown, containment system 800 includes an inner container 810. In one embodiment, inner container 810 is rigid or semi-rigid. As shown, containment system 800 further includes an intermediate flexible container 820 at least partially surrounding inner container 810, an exoskeleton reinforcement 830 at least partially surrounding intermediate flexible container 820 and inner container 810, and an exterior flexible shell 840 at least partially surrounding exoskeleton reinforcement 830, intermediate flexible container 820, and inner container 810. Intermediate flexible container 820 and flexible shell 840 provide additional barriers to contain the contents of inner container 810 should inner container 810 actually fail. Any of inner container 810, intermediate container 820, and exterior shell 840 may in alternative embodiments be rigid, semi-rigid, or flexible.

EXAMPLES

Certain embodiments are described below in the form of examples. It is impossible to depict every potential application of the invention. However, while the embodiments are described in considerable detail, it is not the intention to restrict or in any way limit the scope of the appended claims to such detail, or to any particular application of the invention. For example, for any particular application of the invention to, e.g., an aircraft fuel bladder, a corresponding application is contemplated for any liquid filled, gas filled, or particulate filled container that would benefit from flexible and/or minimal weight reinforcement.

Aircraft fuel bladders are constructed to meet various performance specifications and safety standards associated with flight. For example, to meet one known performance specification, a fuel bladder must survive a 65-foot drop when filled with water. This requirement is presently stated in the military Specification MIL-DTL-27422D. The 65-foot drop represents a height at which a crew theoretically may survive a crash.

Testing of example fuel bladders with skeletal reinforcements of the type described in the present embodiments has shown that the reinforced fuel bladders are capable of surviving a 65-foot drop when filled with fuel, water, or other fluid. Further testing has yielded the unexpected result that a fuel bladder having only two plies of flexible, non-permeable laminate with skeletal reinforcement is capable of surviving a 65-foot drop.

In addition, such a configuration results in a fuel bladder that is significantly lighter in weight than a fuel bladder having four plies of flexible, non-permeable laminate, as demonstrated in Table 1 and Table 2. Indeed, it is an aspect of at least one embodiment that, in addition to meeting performance specifications and safety standards, the fuel bladders are relatively lightweight. This weight reduction may increase fuel efficiency and allow aircraft, e.g., helicopters, to accommodate additional passengers, heavier equipment, or both.

Alternatively, the addition of the herein described skeletal reinforcement to a conventional bladder construction will allow the bladder to withstand higher impacts than would be possible without the skeletal reinforcement, thus making the conventional bladder safer and less likely to rupture during a crash.

Table 1 presents an example of the construction of an impact resistant aircraft fuel bladder having a four-ply construction that yields a net areal density of about 0.798 lbs/ft$^2$ and a total MIL-DTL-27422D Phase I test cube weight of 40.4 lbs.

Additionally, in known fuel bladders, the construction layers may include cement tie layers.

By contrast, Table 2 presents a helicopter fuel bladder having a two-ply construction and a skeletal reinforcement that yields a net areal density of about 0.481 lbs/ft$^2$ and a total MIL-DTL-27422D Phase I test cube weight of 24 lbs. In this construction, all construction layers also include cement layers.

TABLE 1

Four-Ply Laminate Construction of Impact-Resistant Fuel Bladder

| Layer | Material | Approximate Weight (lbs/ft$^2$) |
|---|---|---|
| 1 | HNBR coated inner liner | 0.056 |
| 2 | Nylon fuel barrier | 0.018 |
| 3 | Nitrile coated nylon reinforcing fabric | 0.181 |
| 4 | Nitrile coated nylon reinforcing fabric | 0.181 |
| 5 | Nitrile coated nylon reinforcing fabric | 0.181 |
| 6 | Nitrile coated nylon reinforcing fabric | 0.181 |
| | Total Laminate Weight | 0.798 |

TABLE 2

Two-Ply Laminate Construction of Lightweight, Impact-Resistant Fuel Bladder

| Layer | Material | Approximate Weight (lbs/ft$^2$) |
|---|---|---|
| 1 | HNBR coated inner liner | 0.056 |
| 2 | Nylon fuel barrier | 0.018 |
| 3 | Nitrile coated nylon reinforcing fabric | 0.181 |
| 4 | Nitrile coated nylon reinforcing fabric | 0.181 |
| 5 | Skeletal reinforcement | 0.045 |
| | Total Laminate Weight | 0.481 |

A MIL-DTL-27422D Phase I test cube (a 30 inch by 30 inch by 24 inch fuel bladder) was constructed according to the specifications of Table 2. The skeletal reinforcement was an exoskeleton netting made from DYNEEMA ultrahigh modulus, ultrahigh molecular weight fibers. The netting had a yarn diameter of about 3.1 mm, a mesh diameter of about 40 mm, and a breaking strength of about 863 lbs/yarn. The netting construction was such that the individual fibers were essentially unidirectional along the yarn forming the netting structure, as herein described. The netting was affixed at corners of the rectangular bladder by hand sewing with DYNEEMA fibers. The ends were stabilized by knots. The bladder was filled with about 92.4 gallons of water and dropped from a height of 65 feet. The bladder did not rupture.

A second test was performed in which the skeletal reinforcement was removed from the bladder of Table 2 and replaced with a lighter skeletal reinforcement having a weight of about 0.027 lbs/ft$^2$. The netting used in this skeletal reinforcement had a yarn diameter of about 2.3 mm, a mesh diameter of about 90 mm, and a breaking strength of about 462 lbs/yarn. The netting was affixed at the edges by hand sewing and securing with knots. The bladder was refilled with water and dropped from 65 feet. The bladder did not rupture on impact during the second drop.

By contrast, a MIL-DTL-27422D Phase I test cube (a 30 inch by 30 inch by 24 inch fuel bladder) was constructed according to the specifications of Table 3, having a total cube weight of 22 lbs and no skeletal reinforcement. When the bladder described in Table 3 was filled with about 92.4 gallons of water and dropped from 65 feet, the bladder ruptured.

Table 4 presents an example of the construction of a self-sealing, impact resistant aircraft fuel bladder having a four-ply construction that yields a net areal density of about 1.353 lbs/ft$^2$ and a total MIL-DTL-27422D Phase I test cube weight of 57.8 lbs.

TABLE 3

Two-Ply Laminate Construction Without Skeletal Reinforcement

| Layer | Material | Approximate Weight (lbs/ft$^2$) |
|---|---|---|
| 1 | HNBR coated inner liner | 0.056 |
| 2 | Nylon fuel barrier | 0.018 |
| 3 | Nitrile coated nylon reinforcing fabric | 0.181 |
| 4 | Nitrile coated nylon reinforcing fabric | 0.181 |
| | Total Laminate Weight | 0.436 |

TABLE 4

Four-Ply Laminate Construction of a Self-Sealing, Impact-Resistant Fuel Bladder

| Layer | Material | Approximate Weight (lbs/ft$^2$) |
|---|---|---|
| 1 | HNBR coated inner liner + Fuel Barrier | 0.074 |
| 2 | Self-Sealing Layer (120 mils) | 0.500 |
| 3 | Nitrile coated nylon reinforcing fabric w/tie layer | 0.236 |
| 4 | Nitrile coated nylon reinforcing fabric | 0.181 |
| 5 | Nitrile coated nylon reinforcing fabric | 0.181 |
| 6 | Nitrile coated nylon reinforcing fabric | 0.181 |
| | Total Laminate Weight | 1.353 |

Additionally, in known fuel bladders, the construction layers may include cement tie layers.

By contrast, Table 5 presents a helicopter fuel bladder having a two-ply, self-sealing construction and a skeletal reinforcement that yields a net areal density of about 0.981 lbs/ft$^2$ and a total MIL-DTL-27422D Phase I test cube weight of 40 lbs. In this construction, all construction layers also include cement layers.

A MIL-DTL-27422D Phase I test cube (a 30 inch by 30 inch by 24 inch fuel bladder) was constructed according to the specifications of Table 5. The skeletal reinforcement was an exoskeleton netting made from DYNEEMA ultrahigh modulus, ultrahigh molecular weight fibers. The netting had a yarn diameter of about 3.1 mm, a mesh diameter of about 40 mm, and a breaking strength of about 863 lbs/yarn. The netting construction was such that the individual fibers were essentially unidirectional along the yarn forming the netting structure, as herein described. The netting was affixed at corners of the rectangular bladder by hand sewing with DYNEEMA fibers. The ends were stabilized by knots. The bladder was filled with about 92.4 gallons of water and dropped from a height of 65 feet. The bladder did not rupture

TABLE 5

Two-Ply Laminate Construction of Lightweight, Self-Sealing, Impact-Resistant Fuel Bladder

| Layer | Material | Approximate Weight (lbs/ft$^2$) |
|---|---|---|
| 1 | HNBR coated inner liner + Fuel Barrier | 0.074 |
| 2 | Self-Sealing Layer (120 mils) | 0.500 |
| 3 | Nitrile coated nylon reinforcing fabric | 0.181 |
| 4 | Nitrile coated nylon reinforcing fabric | 0.181 |
| 5 | Skeletal reinforcement | 0.045 |
| | Total Laminate Weight | 0.981 |

A skeleton structure was placed on a 5-gallon high density polyethylene blow molded container and filled with water. The skeletal netting used in this case was made from nylon 6,6 fibers. The mesh had an open space of about 7/16 inch with the fibrous strands comprising the net being about 1/16 inch thick. Filled with water, the 5-gallon containers weighed about 41.7 lbs. Dropping filled containers from a height of 10 feet without the skeletal structure resulted in rupture of the containers in every case. The addition of the fibrous skeleton around the water-filled containers enabled the containers to be dropped from 10 feet without rupturing.

The above-described 5-gallon water container was rhomboid in shape. A spherical, 6-mil thick vinyl container without a skeletal reinforcement was filled with about 35 lbs of water and dropped from about 10 feet. It ruptured upon impact. A second, identical container, also filled with about 35 lbs of water, was wrapped with the example mesh (i.e., an open weave with about 7/16 inch between strands that were about 1/16 inch thick). The mesh-wrapped container was filled and dropped from 10 feet without rupturing.

Another demonstration of the effectiveness of the skeletal approach to mitigating impact forces was shown by dropping an approximately 50 lb bag of cement with and without a skeletal reinforcement. The bag was made from about 4.5 mil thick polyolefin. When dropped from a height of 25 ft, the bag ruptured. A skeletal netting made from DYNEEMA ultrahigh modulus, ultrahigh molecular weight fibers was applied around the bag. The netting had a yarn diameter of about 3.1 mm, a mesh diameter of about 40 mm, with a breaking strength of about 863 lbs/yarn. The bag reinforced with this skeletal reinforcement did not rupture when dropped from a height of 25 ft.

In addition to containers filled with liquids and solid particulates, the application of a skeletal reinforcement can enhance the characteristics of gas-filled containers. Thus, two layers of about 0.002 inch thick aluminum foil were subjected to increasing pressure in a Mullen Burst Tester. The force required to rupture the foil was about 40 psi. An open approximately 7.5 mm diamond mesh polymer netting with about 0.17 mm thick strands and an approximate areal density of netting of about 0.0034 lbs/ft$^2$ was imposed over the two layers of aluminum foil, and the burst strength increased to about 60 psi.

A MIL-PRF-131J film (Class I) burst after the application of about 88 psi of pressure in the Mullen Burst tester. Application of netting increased the burst strength to about 104 psi. In this example, an approximately 9.0 mm diamond mesh polymer netting with about 0.2 mm thick strands and an approximate areal density of netting of about 0.0031 lbs/ft$^2$ was used.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected or contacted through another component or components.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A containment system for containing liquid fuel, comprising:
   a liquid fuel bladder having a flexible peripheral wall with an innermost surface arranged to contact liquid fuel contents of the bladder, an outermost surface defining an outermost surface of the bladder, and a shape that varies under stress applied outwardly by liquid fuel contents of the bladder, wherein the flexible peripheral wall has layers including:
      an innermost layer defining the innermost surface; and
      an impermeable fuel barrier layer formed as a coating over the innermost layer; and
   an exoskeletal reinforcement structure received over the outermost surface of the bladder, wherein the exoskeletal reinforcement structure comprises a flexible mesh that:
      has a shape that varies under stress applied outwardly by the outermost surface of the bladder;
      has open mesh spaces defining voids at which the outermost surface of the bladder is exposed outwardly through the flexible mesh; and
      is flexible separately from the flexible peripheral wall.

2. The containment system of claim 1 wherein the flexible mesh envelops and conforms to the shape of the flexible peripheral wall.

3. The containment system of claim 2 wherein the flexible mesh has portions that are fastened together at junctures retaining the flexible mesh in the conforming shape.

4. The containment system of claim 3 wherein the fastened portions of the flexible mesh include sewing at the junctures.

5. The containment system of claim 3 wherein the fastened portions of the flexible mesh include knots at the junctures.

6. The containment system of claim 3 wherein the junctures comprise corners.

7. The containment system of claim 1, wherein the flexible mesh comprises strands of flexible fibers.

8. The containment system of claim 1 wherein the impermeable fuel barrier layer is formed of nylon.

9. The containment system of claim 7, wherein the flexible fibers comprise organic fibers.

10. The containment system of claim 7, wherein the flexible fibers comprise ceramic fibers.

11. The containment system of claim 7, wherein the flexible fibers comprise metallic fibers.

12. The containment system of claim 7, wherein the flexible fibers comprise at least one of: polyethylene fibers, polypropylene fibers, nylon fibers, polyester fibers, aramid fibers, carbon fibers, liquid crystal fibers, silk fibers, and cellulose based fibers.

13. The containment system of claim 7, wherein the flexible fibers comprise at least one of: glass fibers, aluminum oxide fibers, and boron nitride fibers.

14. The containment system of claim 11, wherein the metallic fibers comprise at least one of: steel fibers, copper alloy fibers, and aluminum fibers.

15. The containment system of claim 8, wherein the flexible mesh comprises ultrahigh modulus, ultrahigh molecular weight polyethylene.

16. The containment system of claim 8, wherein the flexible mesh has a weight of less than about 0.10 pounds per square foot.

* * * * *